United States Patent
Lin et al.

(10) Patent No.: US 12,120,150 B2
(45) Date of Patent: *Oct. 15, 2024

(54) HONEYPOT NETWORK MANAGEMENT BASED ON PROBABILISTIC DETECTION OF MALICIOUS PORT ACTIVITY

(71) Applicant: Rapid7, Inc., Boston, MA (US)

(72) Inventors: Wah-Kwan Lin, Melrose, MA (US); Curtis Barnard, Portland, OR (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,562

(22) Filed: Oct. 2, 2023

(65) Prior Publication Data

US 2024/0031407 A1     Jan. 25, 2024

Related U.S. Application Data

(63) Continuation of application No. 17/196,633, filed on Mar. 9, 2021, now Pat. No. 11,777,988.

(51) Int. Cl.
*H04L 9/40*     (2022.01)

(52) U.S. Cl.
CPC ...... *H04L 63/1491* (2013.01); *H04L 63/1416* (2013.01); *H04L 63/1425* (2013.01); *H04L 63/1433* (2013.01)

(58) Field of Classification Search
CPC ............. H04L 63/1491; H04L 63/1416; H04L 63/1425; H04L 63/1433
See application file for complete search history.

(56) References Cited

U.S. PATENT DOCUMENTS

| | | | |
|---|---|---|---|
| 2015/0161394 A1* | 6/2015 | Ferragut | H04L 9/3273 726/25 |
| 2016/0218949 A1 | 7/2016 | Dasgupta et al. | |
| 2017/0134405 A1* | 5/2017 | Ahmadzadeh | G06F 21/554 |
| 2017/0223052 A1* | 8/2017 | Stutz | H04L 63/1491 |
| 2017/0318053 A1* | 11/2017 | Singh | H04L 63/1425 |
| 2017/0339186 A1* | 11/2017 | Gurvich | H04L 61/5007 |
| 2017/0353492 A1 | 12/2017 | Wick et al. | |
| 2019/0098039 A1 | 3/2019 | Gates et al. | |
| 2019/0238589 A1* | 8/2019 | Stutz | H04L 63/1416 |
| 2020/0177629 A1* | 6/2020 | Hooda | H04L 47/125 |
| 2020/0396201 A1 | 12/2020 | Du et al. | |
| 2021/0049270 A1* | 2/2021 | Urmanov | G06F 18/2185 |
| 2021/0092140 A1* | 3/2021 | Kazerounian | G06N 3/08 |
| 2021/0110282 A1* | 4/2021 | McCann | H04L 63/1416 |
| 2021/0120022 A1* | 4/2021 | Kaderábek | H04L 63/101 |
| 2021/0406148 A1* | 12/2021 | Bertran | G06F 11/079 |

* cited by examiner

*Primary Examiner* — Kambiz Zand
*Assistant Examiner* — Afaq Ali
(74) *Attorney, Agent, or Firm* — Ashwin Anand

(57) ABSTRACT

Disclosed herein are methods, systems, and processes for probabilistically identifying anomalous levels of honeypot activity. A honeypot dataset associated with a honeypot network is received and a representative usage value is determined from the honeypot dataset. The representative usage value is identified as being associated with anomalous behavior if the representative usage value deviates from an expected probability distribution. A remediation operation is initiated in the honeypot network in response to the identification of the representative usage value as being associated with the anomalous behavior by virtue of the representative usage value deviating from the expected probability distribution.

20 Claims, 7 Drawing Sheets

Discrete Probability Distribution Table 305

| Honeypot Field 310 | Type Field 315 | Lambda Field 320 | Distribution Field 325 | Probability Field 330 | Point Estimate Field 335 | Level Field 340 | Scale Field 345 | Result Field 350 | Action Field 355 |
|---|---|---|---|---|---|---|---|---|---|
| Honeypot 110(1) | Port 80 | A | Poisson | Y | B | High | Dispersed | Flag | Initiate |
| | App. A | 100 | Poisson | 92% | 25 | Low | Contained | Ignore | Exclude |
| | Port 443 | 50 | Negative Binomial | 0.01% | 75 | High | Varied | Flag | Include |
| Honeypot 110(2) | App. B | M | Poisson | X | N | Low | Contained | Ignore | Exclude |
| | App. A | 1000 | Negative Binomial | 0.05% | 3000 | High | Dispersed | Flag | Initiate |
| | ... | ... | ... | ... | ... | ... | ... | ... | ... |

HONEYPOT NETWORK MANAGEMENT BASED ON PROBABILISTIC DETECTION OF MALICIOUS PORT ACTIVITY

This Application claims priority under 35 U.S.C. § 120 and is a continuation of U.S. patent application Ser. No. 17/196,633 filed Mar. 9, 2021, titled "Probabilistically Identifying Anomalous Honeypot Activity," the entire contents of which are incorporated herein by reference in its entirety.

BACKGROUND

Field of the Disclosure

This disclosure is related to identifying and remediating anomalous levels of honeypot activity in honeypot networks deployed in cybersecurity environments.

Description of the Related Art

Honeypots are physical or virtual computing systems implemented in a network as decoys to lure malicious actors (e.g., hackers) in an attempt to detect, deflect, and/or study hacking attempts. Such deception systems can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend against attacks from advanced persistent threat actors.

Honeypot cloud networks are often deployed to understand what attackers, security researchers, and organizations are doing in, across, and against cloud environments by deploying low interaction honeypots (e.g., computers that do not solicit services) globally and recording telemetry about connections and incoming attacks to better understand the tactics, techniques, and procedures used by bots as well as malicious human attackers. Understanding the scale of malicious activity in honeypot networks is of particular concern for remediation efforts.

Unfortunately, such honeypot cloud networks routinely pick up on activity and/or connections that generate a significant amount of noise. However, intermixed with such noise can exist cases of genuine concern (e.g., increase in targeted activity against certain ports, application protocols, and the like). Regrettably, existing remediation solutions are severely limited by manual examination of connection patterns. Security practitioners would appreciate an automated paradigm of programmatically determining when a certain scale or level of activity can be indicative of malicious behavior and/or activity.

SUMMARY OF THE DISCLOSURE

Disclosed herein are methods, systems, and processes for identifying and remediating anomalous honeypot activity. Once such method, system, or process involves at least receiving a honeypot dataset associated with a honeypot network, determining, calculating, or computing a representative usage value from the honeypot dataset, identifying the representative usage value as being associated with anomalous behavior if the representative usage value deviates from an expected probability distribution, and initiating a remediation operation in the honeypot network in response to the identification of the representative usage value as being associated with the anomalous behavior by virtue of the representative usage value deviating from the expected probability distribution.

In certain embodiments, the honeypot dataset includes at least one or more connections to at least one or more ports or one or more applications of one or more honeypots in the honeypot network over a period of time, and the representative usage value includes at least an average number of connections to a port of the one or more ports or to an application of the one or more applications over the period of time.

In some embodiments, the expected probability distribution is at least a Poisson distribution, and an activity level probability of the representative usage value is lower than a projected activity probability estimated by the Poisson distribution. In other embodiments, the remediation operation includes at least generating a security workflow.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 3 is a table 300 illustrating a discrete probability distribution table for security operations, according to one embodiment of the present disclosure.

Figure 1A:
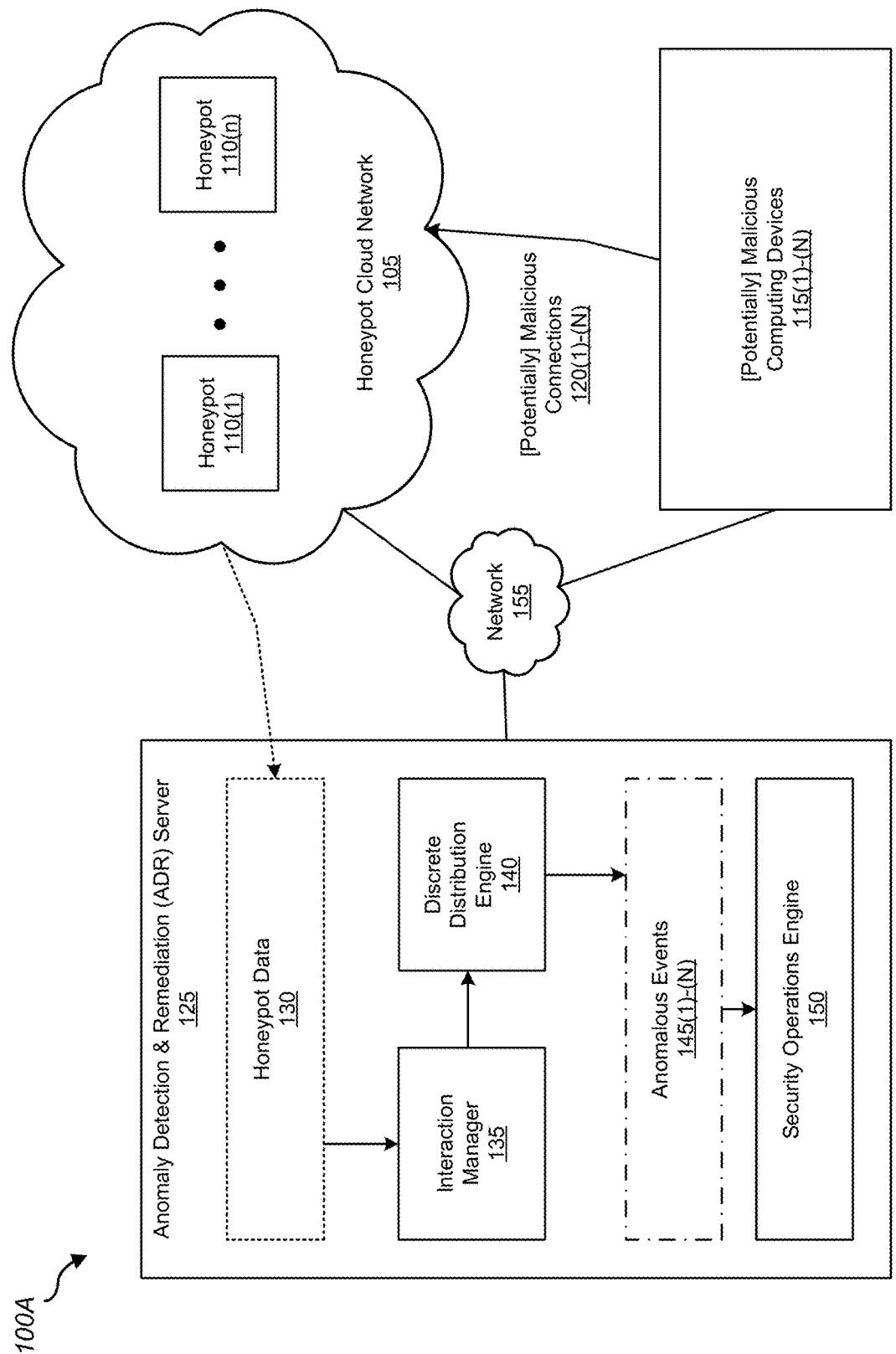
FIG. 1A is a block diagram 100A of an anomaly detection and remediation (ADR) server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Honeypots (e.g., the globally deployed Heisenberg honeypot cloud network operated by Rapid7®, Inc. of Boston, MA) routinely pick up on activity or connections (e.g., from various other computing networks and devices that can include hackers, malicious attackers, bots and the like). Each Heisenberg node (e.g., honeypot) is a lightweight and configurable agent that is centrally deployed and controlled from a central administration portal. Honeypot code is deployed to Heisenberg agents (e.g., for data collection and analysis (DCA) purposes, and the like), and the agents send back full packet captures for post-interaction analysis.

In some implementations of the methods, systems, and processes disclosed herein, interaction and packet capture data is synchronized to a central collector and realtime logs are fed into one or more security products/solutions for live monitoring and historical data mining. Examples of such security products and solutions include, but are not limited to, vulnerability management, incident detection and response, log management, application security, and cloud security. Security workflows can also benefit from such interaction data.

Unfortunately, the data collection by these specially provisioned honeypots of activity, event(s), and/or connection (s) data generates a significant amount of noise. However, intermixed within that noise can exist cases of genuine interest (e.g., a sudden increase in activity targeted at specific application protocols due to a recent release of a viable exploit kit, and the like). Identifying the scale of honeypot activity (e.g., whether particularly high activity is affecting just a few honeypots or many) and the level of honeypot activity (e.g., whether activity with respect to a given honeypot is high or low) can be particularly useful in effectively remediating anomalous behavior with respect to such honeypots.

Rather than manually examining patterns of connections (e.g., to ports, applications, and the like) which is laborious and unscalable, security practitioners would greatly benefit from an automated paradigm that programmatically determines when a certain scale or level of honeypot activity is likely indicative of malicious activity or behavior. Disclosed herein are methods, systems, and processes for identifying and remediating anomalous levels of honeypot activity in honeypot cloud networks.

Example Anomaly Detection and Remediation (ADR) Server

FIG. 1A is a block diagram 100A of an anomaly detection and remediation (ADR) server 125, according to one embodiment. Honeypot cloud network 105 is a network of globally deployed honeypots 110(1)-(N) (e.g., the Heisenberg honeypot cloud network maintained and operated by Rapid7®, Inc. of Boston, MA). One or more honeypots of honeypots 110(1)-(N) in honeypot cloud network 105 can receive potentially malicious connections 120(1)-(N) from potentially malicious computing devices 115(1)-(N). For example, honeypot cloud network 105 observes connections from all over the world targeting specific internet protocol (IP) addresses and ports. The pattern of connections ebb and flow, thus giving rise to a technical need to be able to efficiently identify anomalous behavior associated with such connections.

In certain embodiments, the computing system of FIG. 1A (e.g., ADR server 125) leverages a discrete probability distribution function to examine the scale or discrete events probabilistically. With the foregoing approach, ADR server 125 is able to determine the probability of observing a particular scale of events (assuming normal conditions). For example, if the probability is high (e.g., based on a probability threshold), ADR server 125 can determine that the monitored activity it normal and therefore, not anomalous. However, if the probability is low (e.g., based on the probability threshold), ADR server 125 can determine that the monitored activity is abnormal, and thus anomalous. ADR server 125 can then trigger further security actions and operations (e.g., focused on remediation, vulnerability validation, quarantining or sandboxing honeypots, preventing access to files, adding the monitored activity (e.g., activity targeted at particular application protocols) to incident detection and response rules to trigger alerts from detection messages, and the like).

ADR server 125, which can be any type of physical or virtual computing device, includes a processor, a memory, and at least the following components: honeypot data 130 associated with one or more of honeypots 110(1)-(N) and received or accessed from honeypot cloud network 105, an interaction manager 135 for managing connection data and interaction events (e.g., between one or more malicious computing devices 115(1)-(N) and one or more honeypots 110(1)-(N)), a discrete distribution engine 140 for generating anomalous events 145(1)-(N), and a security operations engine 150 to trigger one or more security operations.

ADR server 125, honeypot cloud network 105, and malicious computing devices 115(1)-(N) are communicatively coupled to each other via a network 155, which is different than honeypot cloud network 105, and can be any type of network or interconnection (e.g., the Internet). ADR server 125 computes probabilities of security events using one or more discrete probability distribution functions. Such security events are unique to honeypots 110(1)-(N) that are part of honeypot cloud network 105 and can be probabilistically analyzed to configure and cause security operations engine 150 to trigger targeted security operations that can safeguard honeypots 110(1)-(N) from high levels or dispersed scales of malicious honeypot activity.

Example Honeypot Security Data

Figure 1B:
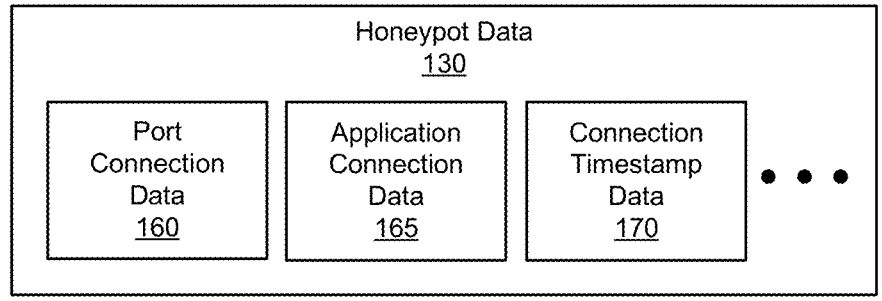
FIG. 1B is a block diagram 100B of honeypot data, according to one embodiment of the present disclosure.

FIG. 1B is a block diagram 100B of honeypot data 130, according to one embodiment. Honeypot data 130 includes data that is: (a) associated with one or more honeypots 110(1)-(N) and (b) indicative of the interaction between one or more malicious computing devices 115(1)-(N) and one or more honeypots 110(1)-(N), over a period of time. In some embodiments, honeypot data 130 includes at least port connection data 160, application connection data 165, and connection timestamp data 170 (e.g., a timestamp for each port connection event and/or application connection event, for each honeypot). Therefore, honeypot data 130 includes a history of connections to a given honeypot. Other types of event, activity, and/or interaction data items other than port connection data 160, application connection data 165, and timestamp data 170 are contemplated (e.g., exfiltration history data, authentication and credential data, and the like).

Example Interaction Manager

Figure 1C:
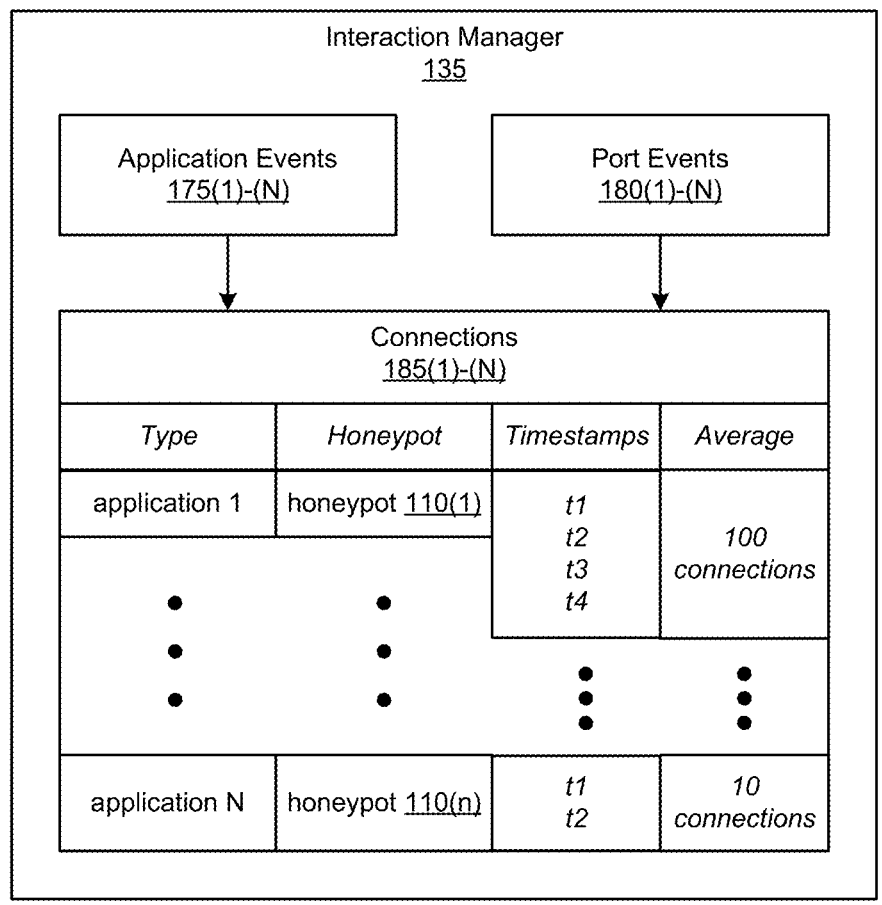
FIG. 1C is a block diagram 100C of an interaction manager to prepare and process honeypot data, according to one embodiment of the present disclosure.

FIG. 1C is a block diagram 100C of interaction manager 135 that prepares and processes honeypot data for probabilistic statistical processing, according to one embodiment. Interaction manager 135, which is part of ADR server 125, extracts at least application events 175(1)-(N) and port events 180(1)-(N) from application connection data 165 and port connection data 160, respectively, based on the timestamps that are part of connection timestamp data 170. As shown in FIG. 1C, interaction manager 135 maintains an association between ports and/or applications connected to and the duration and number of those connections. Therefore, interaction manager 135 is able to determine the average number of connections to a port and/or an application in a honeypot over a defined period of time.

Example Discrete Distribution Engine

Figure 2:
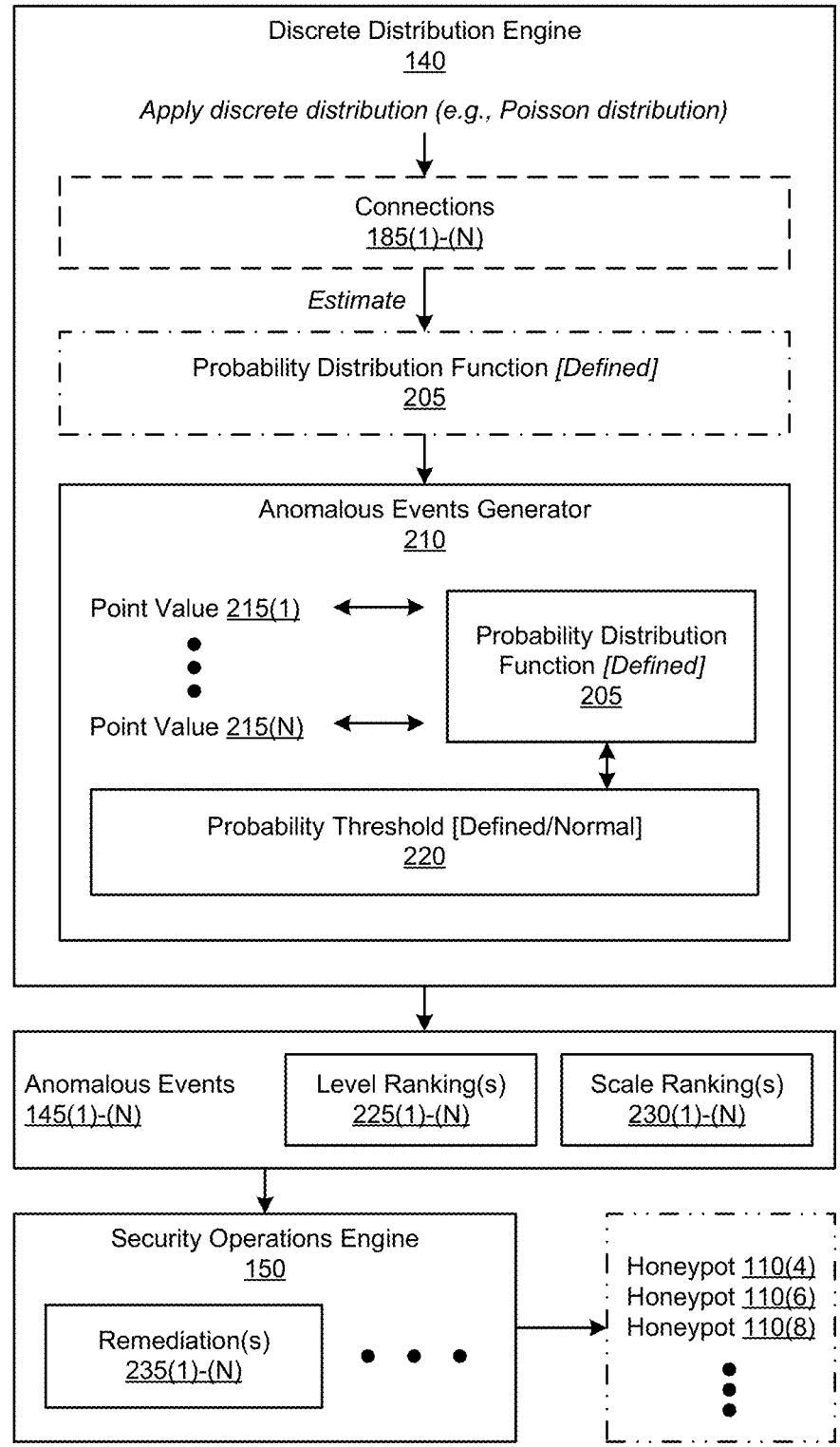
FIG. 2 is a block diagram of a discrete distribution engine for identifying and remediating anomalies in honeypots, according to one embodiment of the present disclosure.

FIG. 2 is a block diagram of discrete distribution engine 140 that identifies and remediates anomalies in honeypots, according to one embodiment. Discrete distribution engine 140 is configured to apply one or more discrete probability functions that inform the probability of particular honeypot connection, interaction, and/or activity events. In one embodiment, a Poisson distribution is used to model the foregoing concerns related to connection to honeypots (e.g., connection data) to identify and remediate anomalous levels of honeypot activity. The Poisson distribution is concerned with discrete events over defined periods of time or some other range of consideration, requires a single average parameter to operate, and is bound between 0 and infinity. In a Poisson distribution, events are assumed to be independent. Therefore, a Poisson distribution can be utilized to determine the probability or cumulative probability of particular outcomes based on an observed historical pattern. The Poisson distribution function is defined as: Pr (X=x)= ((lambda**x)*(e**(-lambda)))/(x!), where lambda is an average value, x refers to a specific count of an event, x! is the x factorial, and e is Euler's number.

As previously noted, interaction manager 135 examines the history of connections to a honeypot (e.g., connections 185(1)-(N)) as shown in FIG. 1C) and calculates a lambda value (e.g., an average daily number of connections to honeypot cloud network 105 or to a given honeypot in honeypot cloud network 105 over a defined interval of time (e.g., 1 month)). In one embodiment, discrete distribution engine 140 uses the single lambda value to estimate a Poisson distribution (e.g., probability distribution function 205 as shown in FIG. 2). If the estimated discrete distribution is reflective of normal patterns (e.g., based on a threshold), discrete distribution engine 140 compares a point estimate (also called a point value) and greater, against the distribution, and computes a probability for the point estimate and greater.

For example, if an average number of daily connections to port Z is A, and ADR server 125 observes B number of connections to port Z on a specific date, discrete distribution engine 140 determines a probability of observing B or more connections to port Z on any given day as Y %. If Y is large (e.g., 90%), discrete distribution engine 140 determines that the connection event is not abnormal (and thus, not anomalous). But, if Y is small (e.g., 0.01%), discrete distribution engine 140 determines that the connection event is abnormal/unlikely (and thus, anomalous).

As shown in FIG. 2, discrete distribution engine 140 applies a discrete distribution (e.g., a Poisson distribution or a Negative Binomial distribution, among others) to connections 185(1)-(N) (e.g., prepared connection data). An anomalous events generator 210 compares a point value 215(1) to the defined probability distribution function 205, based on a probability threshold 220 that is defined and indicative of a normal pattern—e.g., a distribution reflective of normal patterns that can be based on a threshold for the type of connection data being analyzed (e.g., port connection data, application connection data, and the like).

Discrete distribution engine 140 then generates one or more anomalous events 145(1)-(N) which include level rankings 225(1)-(N) and scale rankings 230(1)-(N) of particular connection events of concern—e.g., connection events that have been deemed anomalous or abnormal because of a low probability (of their likelihood) output by probability distribution function 205. Level rankings 225 (1)-(N) rank connection events based on whether the connection events are unusually large and thus abnormal (e.g., high or low), whereas scale rankings 230(1)-(N) ranks connection events based on whether the connection events are similarly deemed or determined to be abnormal over two or more honeypots in honeypot cloud network 105 (e.g., widely dispersed over several honeypots, contained within one or more honeypots, or varied among the several honeypots).

Discrete distribution engine 140 then transmits the results—e.g., anomalous events 145(1)-(N) to security operations engine 150 to initiate and/or trigger one or more remediations 235(1)-(N) (e.g., remediation operations) for the identified honeypots (e.g., honeypots 110(4), 110(6), and 110(8)). Such remediation operations can include a vulnerability assessment operation or a vulnerability validation operation necessitated by connection events indicating a particular port or application vulnerability being targeted repeatedly on a given honeypot (e.g., a high level) or across various honeypots (e.g., at scale) in honeypot cloud network 105. Because discrete distribution engine 140 can rank such connection events based on level and scale, security operations engine 150 can appropriately prioritize (and size) subsequent remediation operations based on such probabilistic rankings. Other example of security and remediation operations include, but are not limited to, modifying intrusion detection system rules, configuring and/or updating the type of detection messages that trigger alerts (e.g., in a security information and event management (STEM) system), preventing access or exfiltration, and the like.

Example of Probabilistically Identifying Anomaly Levels in Honeypot Connections

In one embodiment, ADR server 125 receives a honeypot dataset (e.g., honeypot data 130) associated with a honeypot network (e.g., honeypot cloud network 105). Interaction manager 135 determines a representative usage value from the honeypot dataset (e.g., the average number of connections to an application or to a port over a defined time period that can be scaled up or down to account for a sudden increase in connections). Then, discrete distribution engine 140 identifies the representative usage value (e.g., a lambda value of average connections) as being associated with anomalous behavior if the representative usage value deviates from an expected probability distribution (e.g., a Poisson distribution, a Negative Binomial distribution, among others, generated by probability distribution function 205). Security operations engine 150 then initiates a remediation operation (e.g., remediations 235(1)-(N), which can include orchestrating security workflows for vulnerability assessment, vulnerability validation, vulnerability remediation, alert generation upon incident detection, modification of alerts that fire for particular detection messages, and the like) in honeypot cloud network 105 in response to the identification of the representative usage value as being associated with the anomalous behavior by virtue of the representative usage value deviating from the expected probability distribution.

In one embodiment, honeypot dataset 130 includes one or more connections to at least one or more ports or one or more applications of one or more honeypots in honeypot cloud network 105 over a period of time. In this example, the representative usage value includes an average number of connections to a port of the one or more ports or to an application of the one or more applications over the same period of time. In another example, an activity level probability of the representative usage value is lower than a projected activity probability estimated by a Poisson distribution (e.g., based on a point estimate or point value).

Example Discrete Probability Distribution Table for Remediations

FIG. 3 is a table 300 illustrating a discrete probability distribution table 300 for security operations, according to one embodiment. For each honeypot 110(1)-(N) in honeypot cloud network 105 that receives or picks up one or more connections (and one or more types of connections), discrete probability distribution table 300 maintains at least the following fields: a honeypot field 310, a type field 315, a lambda field 320, a distribution field 325, a probability field 330, a point estimate field 335, a level field 340, a scale field 345, a result field 350, and an action field 355. Based on the number and intensity of connections received by honeypots in honeypot cloud network 105 for a defined duration of time, the honeypot field 310 identifies each honeypot connected to; the type field 315 identifies what is being connected to (e.g., a port, an application, and the like); the lambda field 320 maintains lambda information (e.g., the average number of connections for the defined duration of time, among other possible statistical variations); the distribution field 325 maintains information about the discrete probability distribution methodology used (e.g., Poisson, Negative Binomial, and the like); the probability field 330 maintains results of the discrete distribution (e.g., the probability); the point estimate field 335 maintains information about point estimates or point values (to make subsequent probabilistic comparisons); the level field 340 identifies whether the probability of the number of connections, based on the defined discrete distribution, is high or low (for a given honeypot); the scale field 345 identifies whether the probability of the number of connections, based on the defined discrete distribution, is dispersed (a significant number of honeypot cloud network 105 (e.g., greater than 50%)), varied (only some honeypots in honeypot cloud network 105 (e.g., less than 10%)), or contained (to only a single or given honeypot); the result field 350 maintains information to designate the monitored connection activity as data item(s) to be flagged as anomalous or ignored as not abnormal; and the action field 355 maintains information to enable the initiation and triggering of certain specific security actions or the excluding of certain honeypots from security actions (e.g., based on attack context information that can be derived from the port connections and/or application connections).

In this manner, discrete probability distribution table 300 can enable security action engine 150 to properly scale and size remediations 235(1)-(N) based on the probabilistic identification of anomalous levels of honeypot activity in honeypot cloud network 105. In one embodiment, interaction manager 135 refines a subset of honeypot data 130 to filter out data points that do not warrant consideration (e.g., spurious connections that do not include repeat activity that might be suggestive of malicious behavior). In another embodiment, interaction manager 135 modifies a unit of examination (e.g., a unit of honeypot data 130) to be pairwise elements that account for both source and destination hosts. Further refinement can be performed by also normalizing a set of honeypots (e.g., honeypots 110(1)-(N)) to control for variations based on an organization's internal computing and networking infrastructure configuration(s).

Example Processes to Probabilistically Identify Anomalous Honeypot Activity

Figure 4A:
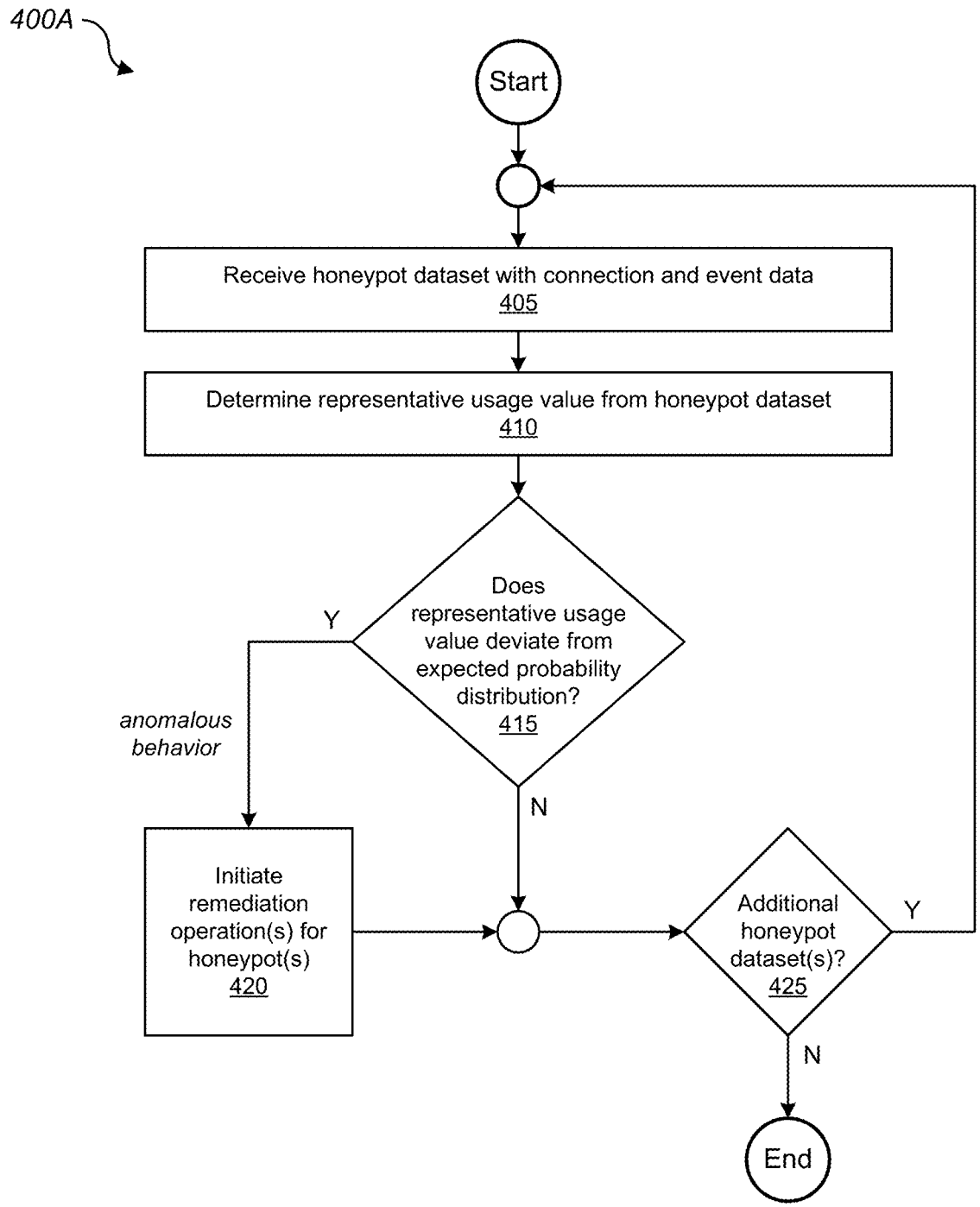
FIG. 4A is a flowchart 400A of a process for initiating remediation operations for honeypots, according to one embodiment of the present disclosure.

FIG. 4A is a flowchart 400A of a process for initiating remediation operations for honeypots, according to one embodiment. The process begins at 405 by receiving a honeypot dataset (e.g., that is part of honeypot data 130) with connection and event data (e.g., to ports, applications, and the like). At 410, the process determines a representative usage value from the honeypot dataset (e.g., an average number of connections to a specific port or application over a defined and monitored period of time). At 415, the process determines whether the representative usage value deviates from an expected probability distribution (provided by a Poisson distribution or some other discrete probability distribution). If the representative usage value deviates from the expected probability distribution, the process, at 420, initiates one or more remediation operations for honeypots (e.g., after flagging and designating connection, events, and activity in the dataset as abnormal and likely indicative of anomalous behavior). At 425, the process determines if there are additional honeypot datasets. If there are additional honeypot datasets, the process loops to 405. Otherwise, the process ends.

Figure 4B:
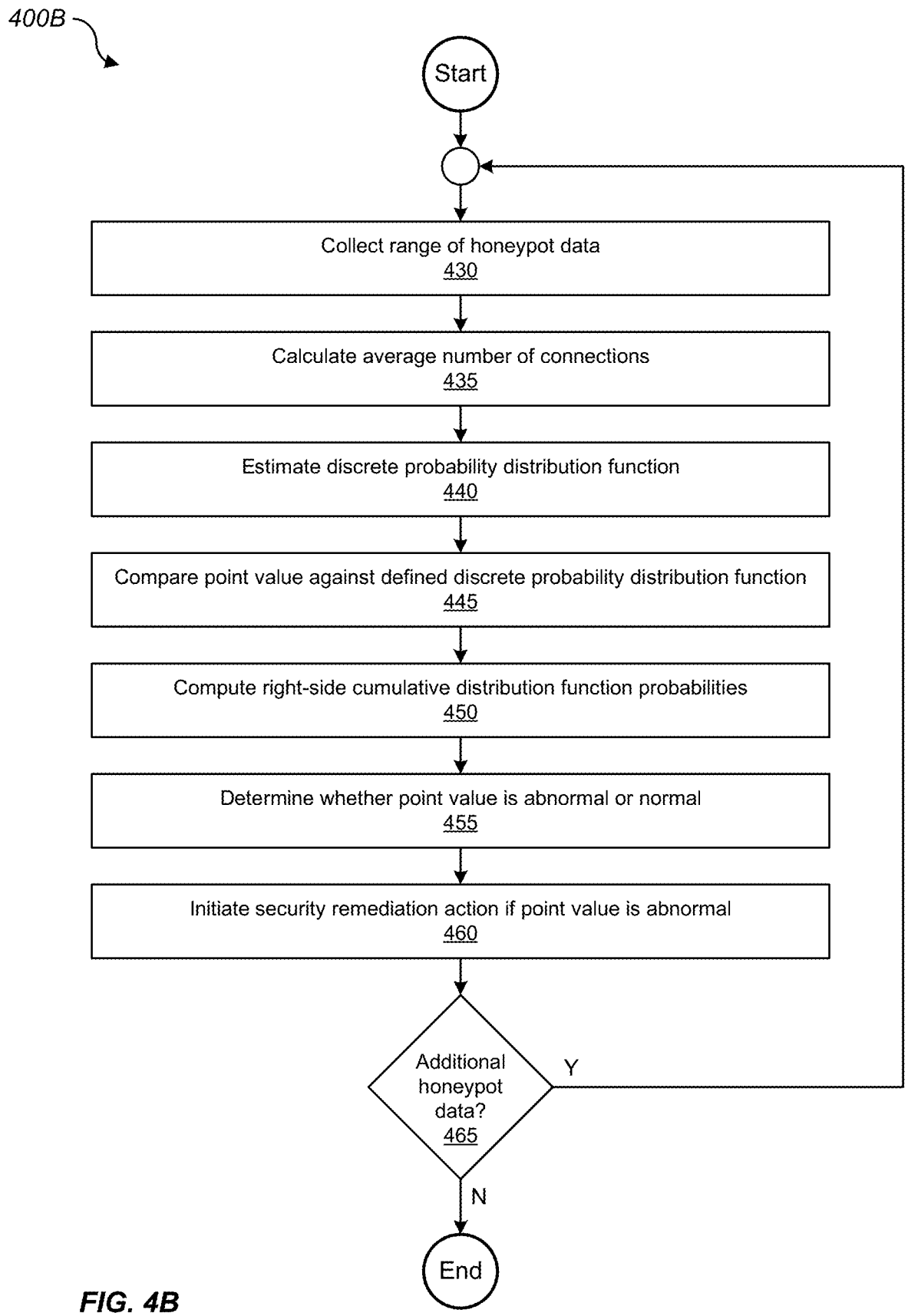
FIG. 4B is a flowchart 400B of a process for identifying and remediating anomalous levels of honeypot activity, according to one embodiment of the present disclosure.

FIG. 4B is a flowchart 400B of a process for identifying and remediating anomalous levels of honeypot activity, according to one embodiment. The process begins at 430 by collecting a range of honeypot data (e.g., details on ports and/or applications connected to over several periods of time). At 435, the process calculates an average number of connections (e.g., to an application of interest over a defined period of time). At 440, the process estimates a discrete probability distribution function (e.g., by utilizing the Poisson distribution or other discrete distribution), and at 445, compares a point value against the defined discrete probability distribution function. At 450, the process computes right-side cumulative distribution function probabilities (e.g., to ascertain the probability that a given point value or higher would have occurred by chance, absent of one or more affecting scenarios).

At 455, the process determines whether the point value is abnormal or normal (e.g., based on a defined probability threshold) and at 460, initiates a security remediation action if the point value is abnormal. For example, if the probability of the point value or higher is lower than the defined probability threshold, ADR server 125 determines that the event is abnormal, includes the event in anomalous events 145(1)-(N), and notifies security action engine 150 to initiate a defensive security action or one or more remediations. However, if the probability of the point value or higher is greater than the defined probability threshold, ADR server 125 ignores the event (as not abnormal) and excludes the event from anomalous events 145(1)-(N) (and consequently from subsequent or scheduled security and/or remediation operations). At 465 the process determines if there is additional honeypot data. If there is additional honeypot data, the process loops to 430. Otherwise, the process ends.

Example Computing and Networking Environment

Figure 5:
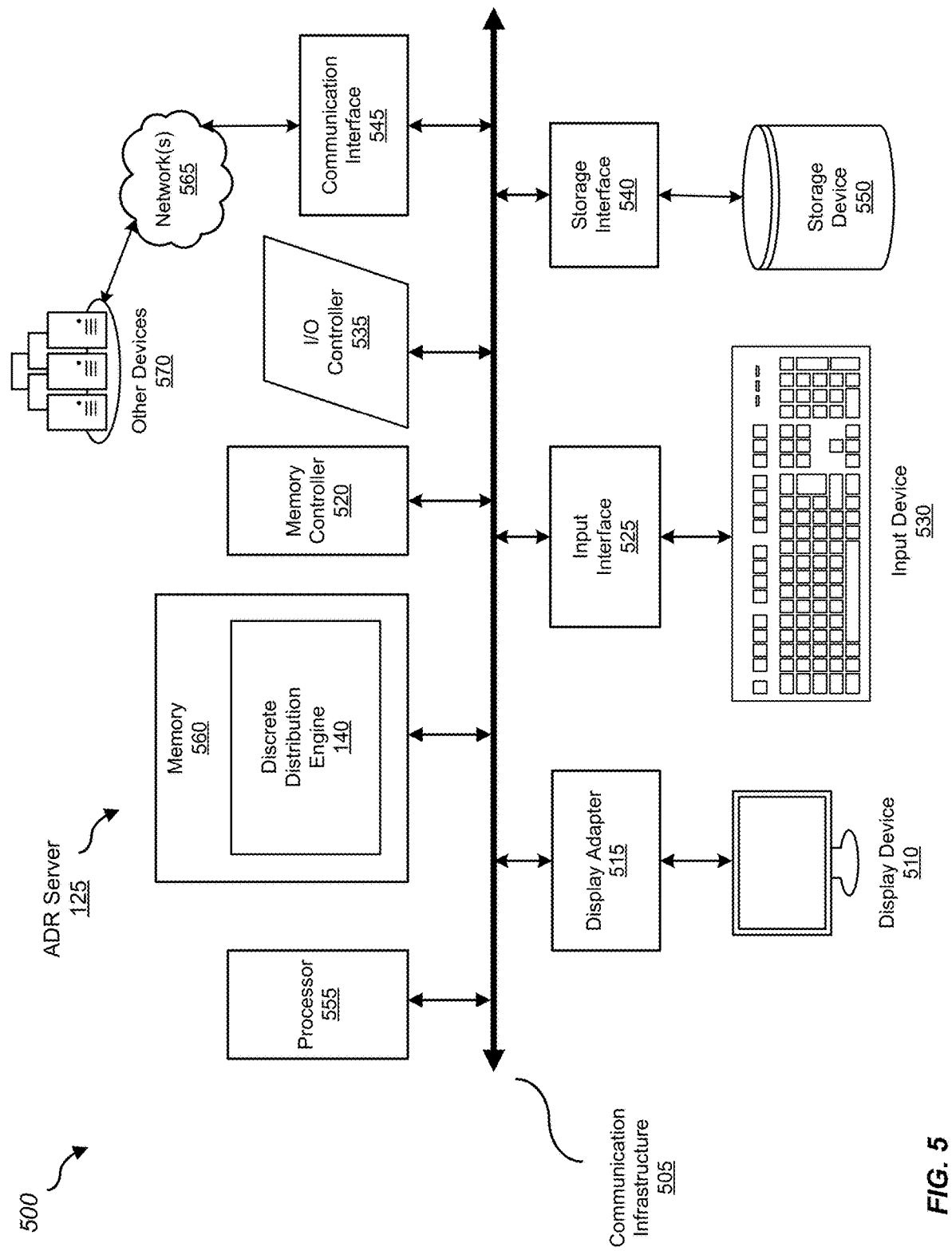
FIG. 5 is a block diagram 500 of a computing and networking system, illustrating how a discrete distribution engine can be implemented in software, according to one embodiment of the present disclosure.

FIG. 5 is a block diagram 500 of a computing system, illustrating how a discrete distribution engine can be implemented in software, according to one embodiment. Computing system 500 can include ADR server 125 and broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, and the like. In its most basic configuration, computing system 500 may include at least one processor 555 and a memory 560. By executing the software that executes discrete distribution engine 140, computing system 500 becomes a special purpose computing device that is configured to probabilistically identify anomalous honeypot activity.

Processor 555 generally represents any type or form of processing unit capable of processing data or interpreting and executing instructions. In certain embodiments, processor 555 may receive instructions from a software application or module. These instructions may cause processor 555 to perform the functions of one or more of the embodiments described and/or illustrated herein. For example, processor 555 may perform and/or be a means for performing all or some of the operations described herein. Processor 555 may also perform and/or be a means for performing any other operations, methods, or processes described and/or illustrated herein.

Memory 560 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 500 may include both a volatile memory unit and a non-volatile storage device. In one example, program instructions implementing discrete distribution engine 140 and/or security action engine 150 may be loaded into memory 560.

In certain embodiments, computing system 500 may also include one or more components or elements in addition to processor 555 and/or memory 560. For example, as illustrated in FIG. 5, computing system 500 may include a memory controller 520, an Input/Output (I/O) controller 535, and a communication interface 545, each of which may be interconnected via a communication infrastructure 505. Communication infrastructure 505 generally represents any type or form of infrastructure capable of facilitating communication between one or more components of a computing device. Examples of communication infrastructure 505 include, without limitation, a communication bus (such as an Industry Standard Architecture (ISA), Peripheral Component Interconnect (PCI), PCI express (PCIe), or similar bus) and a network.

Memory controller 520 generally represents any type/form of device capable of handling memory or data or controlling communication between one or more components of computing system 500. In certain embodiments, memory controller 520 may control communication between processor 555, memory 560, and I/O controller 535 via communication infrastructure 505. In certain embodiments, memory controller 520 may perform and/or be a means for performing, either alone or in combination with other elements, one or more of the operations or features described and/or illustrated herein. I/O controller 535 generally represents any type or form of module capable of coordinating and/or controlling the input and output functions of a computing device. For example, in certain embodiments I/O controller 535 may control or facilitate transfer of data between one or more elements of computing system 500, such as processor 555, memory 560, communication interface 545, display adapter 515, input interface 525, and storage interface 540.

Communication interface 545 broadly represents any type/form of communication device/adapter capable of facilitating communication between computing system 500 and other devices and may facilitate communication between computing system 500 and a private or public network. Examples of communication interface 545 include a wired network interface (e.g., network interface card), a wireless network interface (e.g., a wireless network interface card), a modem, and any other suitable interface. Communication interface 545 may provide a direct connection to a remote server via a direct link to a network, such as the Internet, and may also indirectly provide such a connection through, for example, a local area network. Communication interface 545 may also represent a host adapter configured to facilitate communication between computing system 500 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 500 may also include at least one display device 510 coupled to communication infrastructure 505 via a display adapter 515 that generally represents any type or form of device capable of visually displaying information forwarded by display adapter 515. Display adapter 515 generally represents any type or form of device configured to forward graphics, text, and other data from communication infrastructure 505 (or from a frame buffer, as known in the art) for display, on display device 510. Computing system 500 may also include at least one input device 530 coupled to communication infrastructure 505 via an input interface 525. Input device 530 generally represents any type or form of input device capable of providing input, either computer or human generated, to computing system 500. Examples of input device 530 include a keyboard, a pointing device, a speech recognition device, or any other input device.

Computing system 500 may also include storage device 550 coupled to communication infrastructure 505 via a storage interface 540. Storage device 550 generally represents any type or form of storage devices or mediums capable of storing data and/or other computer-readable instructions. For example, storage device 550 may include a magnetic disk drive (e.g., a so-called hard drive), a floppy disk drive, a magnetic tape drive, an optical disk drive, a flash drive, or the like. Storage interface 540 generally represents any type or form of interface or device for transmitting data between storage device 550, and other components of computing system 500. Storage device 550 may be configured to read from and/or write to a removable storage unit configured to store computer software, data, or other computer-readable information. Examples of suitable removable storage units include a floppy disk, a magnetic tape, an optical disk, a flash memory device, or the like. Storage device 550 may also include other similar structures or devices for allowing computer software, data, or other computer-readable instructions to be loaded into computing system 500. For example, storage device 550 may be configured to read and write software, data, or other computer-readable information. Storage device 550 may also be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5. Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The computer-readable medium containing the computer program may be loaded into computing system 500. All or a portion of the computer program stored on the computer-readable medium may then be stored in memory 560, and/or various portions of storage device 550. When executed by processor 555, a computer program loaded into computing system 500 may cause processor 555 to perform and/or be a means for performing the functions of one or more of the embodiments described/illustrated herein. Alternatively, one or more of the embodiments described and/or illustrated herein may be implemented in firmware and/or hardware.

Network 565 (shown as network 155 in FIG. 1A) generally represents any type or form of computer network or architecture capable of facilitating communication between ADR server 125 and honeypot cloud network 105. For example, network 565 can be a Wide Area Network (WAN) (e.g., the Internet) or a Local Area Network (LAN). In certain embodiments, a communication interface, such as communication interface 545 in FIG. 5, may be used to provide connectivity between ADR server 125 and honeypot cloud network 105, and network 565. Discrete distribution engine 140 and security action engine 150 may be implemented together (e.g., in ADR server 125) or can be implemented separately. The embodiments described and/or illustrated herein are not limited to the Internet or any particular network-based environment.

In some embodiments, discrete distribution engine 140 and security action engine 150 may be part of ADR server 125 respectively or may be separate. If separate, discrete distribution engine 140 and security action engine 150, and ADR server 125 may be communicatively coupled via network 565. In one embodiment, all, or a portion of one or more of embodiments may be encoded as a computer program and loaded onto and executed by ADR server 125 and may be stored on the "cloud" (e.g., on honeypot cloud network 105) and distributed over network 565.

In some examples, all or a portion of discrete distribution engine 140 and security action engine 150, and/or ADR server 125 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, discrete distribution engine 140 and/or security action engine 150 may transform the behavior of ADR server 125 to perform probabilistic identification and remediation of anomalous honeypot activity.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   receiving a honeypot dataset associated with a honeypot network, wherein the honeypot dataset comprises one or more connections to at least one or more ports of one or more honeypots in the honeypot network over a period of time;
   determining a number of connections to a port of the one or more ports over the period of time;
   determining that the number of connections is associated with malicious activity based on a probability of a deviation of the number of connections from a historical average of the number of connections based on an expected probability distribution according to a discrete probability distribution function configured for the port;
   identifying one or more malicious computing devices associated with the malicious activity;
   modifying one or more intrusion detection rules or intrusion alert triggers based on the malicious activity and the one or more malicious computing devices; and
   performing a remediation operation on one or more computer devices in response to the determination that the number of connections is associated with malicious activity, wherein the remediation operation includes one or more of preventing access to or exfiltration from the one or more computer devices or generating a security workflow for vulnerability assessment of the one or more computer devices.

2. The computer-implemented method of claim 1, wherein the expected probability distribution comprises a Negative Binomial distribution, the expected probability distribution comprises a Poisson distribution, and the determination that the number of connections is associated with malicious activity is made based on an activity level probability of a representative usage value of the port being lower than a projected activity probability estimated by the Poisson distribution.

3. The computer-implemented method of claim 1, wherein the historical average is determined from one or more previous honeypot datasets received from the honeypot network.

4. The computer-implemented method of claim 1, wherein the identification of the one or more malicious computing devices and the modification of the one or more intrusion detection rules or intrusion alert triggers are performed by an anomaly detection and remediation (ADR) server.

5. The computer-implemented method of claim 4, wherein the honeypot network includes virtual machines hosted in a cloud network.

6. The computer-implemented method of claim 5, wherein the ADR server is a virtual machine hosted in the cloud network.

7. The computer-implemented method of claim 1, wherein the honeypot dataset is received over a public network.

8. The computer-implemented method of claim 1, further comprising:
   monitoring for connection anomalies of the port based on observed connection durations of the port.

9. The computer-implemented method of claim 1, further comprising:
monitoring for connection anomalies to a plurality of ports in the honeypot network, wherein each port is monitored based on a different discrete probability function.

10. The computer-implemented method of claim 9, further comprising:
generating anomaly events for individual ports based on the monitoring;
ranking the anomaly events; and
using the ranking to prioritize remediation operations on the ports.

11. The computer-implemented method of claim 10, wherein the ranking comprises (a) a level ranking based on a number of anomaly events observed for a particular port, and (b) a scale ranking based on a distribution of anomaly events observed over multiple honeypots in the honeypot network.

12. The computer-implemented method of claim 10, wherein the remediation operation is prioritized based on the ranking of anomaly events.

13. A system comprising:
one or more computing devices that implement an anomaly detection and remediation (ADR) server, configured to:
receive a honeypot dataset associated with a honeypot network, wherein the honeypot dataset comprises one or more connections to at least one or more ports of one or more honeypots in the honeypot network over a period of time;
determine a number of connections to a port of the one or more ports over the period of time;
determine that the number of connections is associated with malicious activity based on a probability of a deviation of the number of connections from a historical average of the number of connections based on an expected probability distribution according to a discrete probability distribution function configured for the port;
identify one or more malicious computing devices associated with the malicious activity;
modify one or more intrusion detection rules or intrusion alert triggers based on the malicious activity and the one or more malicious computing devices; and
perform a remediation operation on one or more computer devices in response to the determination that the number of connections is associated with malicious activity, wherein the remediation operation includes one or more of preventing access to or exfiltration from the one or more computer devices or generating a security workflow for vulnerability assessment of the one or more computer devices.

14. The system of claim 13, wherein the expected probability distribution comprises a Negative Binomial distribution, the expected probability distribution comprises a Poisson distribution, and the determination that the number of connections is associated with malicious activity is made based on an activity level probability of a representative usage value of the port being lower than a projected activity probability estimated by the Poisson distribution.

15. The system of claim 13, wherein the historical average is determined from one or more previous honeypot datasets received from the honeypot network.

16. The system of claim 13, wherein the honeypot network includes virtual machines hosted in a cloud network, and the honeypot dataset is received over a public network.

17. The system of claim 13, wherein the ADR server is configured to:
monitor for connection anomalies of the port based on observed connection durations of the port.

18. The system of claim 13, wherein the ADR server is configured to:
monitor for connection anomalies to a plurality of ports in the honeypot network, wherein each port is monitored based on a different discrete probability function.

19. The system of claim 18, wherein the ADR server is configured to:
generate anomaly events for individual ports based on the monitoring;
rank the anomaly events; and
use the ranking to prioritize remediation operations on the ports.

20. The system of claim 19, wherein the remediation operation is prioritized based on the ranking of anomaly events.

* * * * *